United States Patent [19]

Senba

[11] 4,167,788

[45] Sep. 11, 1979

[54] PROGRAMMABLE SEQUENCE CONTROL DEVICE SIMULATING FLOW CHART SEQUENCES

[76] Inventor: Junichi Senba, 32-12, 1-chome, Minami-urawa, Urawa-shi, Saitama-ken, Japan

[21] Appl. No.: 827,352

[22] Filed: Aug. 24, 1977

Related U.S. Application Data

[63] Continuation-in-part of Ser. No. 673,050, Apr. 2, 1976.

[30] Foreign Application Priority Data

Apr. 5, 1975 [JP] Japan .................................. 50-40825

[51] Int. Cl.² .......................... G06G 7/00; G06G 7/06; G06G 7/48; G06J 1/00
[52] U.S. Cl. ...................................................... 364/802
[58] Field of Search ............... 364/800, 801, 802, 807, 364/900 MS File

[56] References Cited

U.S. PATENT DOCUMENTS

| | | | |
|---|---|---|---|
| 2,609,988 | 9/1952 | Beckwith et al. | 364/800 |
| 3,231,723 | 1/1966 | Gilliland et al. | 364/800 |
| 3,573,450 | 4/1971 | Fricke, Jr. et al. | 364/800 |
| 3,744,029 | 7/1973 | Nyman | 364/900 |
| 3,939,336 | 2/1976 | Vasiliev et al. | 364/800 |
| 3,944,987 | 3/1976 | Koyanagi et al. | 364/900 |
| 3,975,835 | 8/1976 | Reichman | 364/800 |

*Primary Examiner*—Gareth D. Shaw
*Assistant Examiner*—Michael C. Sachs

[57] ABSTRACT

A programmable sequence control device for programming a control sequence by simulating the steps of a flow chart comprises a plurality of stages each of which is visually representative of a step in the flow chart and is selectively wired to other stages for simulating the flow chart. The stages comprise contact points representing output terminals, address terminal and jumping control terminal, respectively. A logic control circuit between each two stages at the respective contact points comprises first logic means producing a first output signal based on the combination of signals at the output terminal and jumping control terminal of a first stage and second logic means responsive to an address signal applied to the address terminal of another stage for producing a further output signal applied at the output terminal of the latter stage. Upon application of a starting command at a selected stage, the stages sequence through the steps simulating the operations of the intended flow chart.

8 Claims, 9 Drawing Figures

PROGRAMMABLE SEQUENCE CONTROL DEVICE SIMULATING FLOW CHART SEQUENCES

BACKGROUND OF THE INVENTION

This is a continuation-in-part application of U.S. patent application Ser. No. 673,050, filed Apr. 2, 1976.

This invention relates to sequential logic control circuits for use in digital sequence control systems.

As is well known in the art, a sequential control circuit is a logic circuit constructed to provide an output control which successively advances through the serially connected stages in response to a clock signal. Typically, a digital system has a finite set of control conditions called states. These states are often also referred to as steps and are the stages in the sequencing of the system where an action or actions are performed. In order to provide a system control which is much more powerful than simply permitting the system to proceed serially or monotonically, it is possible to have the system repeat a portion of its sequence by means of looping. The functioning of the system wherein it is caused to go to a stage other than the next one in the sequence is called a jump or transition. Jumping is made even more powerful by controlling the jump by making it conditional. An output control signal may be inhibited or enabled in its jump to some other stage, by any simple logical element such as a counter which can recognize a predetermined number of loop traverses.

These sequence digital control circuits are often used to control the operation of many types of systems. There are many text books now available which discuss the problems involved in sequencing a system to achieve digital control of a system. Representative of such textbooks is *Electronic Digital Techniques,* Chapter 11 of P. M. Kinter, McGraw-Hill, New York, 1968.

Very often a pin board or patch cord system is provided to permit changing or setting the sequence of the control program to fit the particular application. Such pin boards are also very useful for visually determining the operational content of the program. However, such systems are complicated and very inconvenient for a beginner or student to use in learning to understand the techniques involved in programming the sequential operation of a relatively large control system.

SUMMARY OF THE INVENTION

It is an object of this invention to provide an improved sequence control circuit capable of readily forming a desired decisional logic program.

It is another object to provide a sequential control circuit which resembles a flow chart in its arrangement and is adaptable by making simple wiring changes.

It is further an object of the present invention to provide a sequential control circuit training device which clearly illustrates the steps and decisions performed in controlling the system operation, which may be used by a student.

According to the present invention, there is provided a logic sequence control circuit having a plurality of stages each composed of a circuit unit including an output terminal at which an output signal appears in dependence on a given program, an address terminal adapted to receive an address signal, and a jumping control terminal adapted to receive a jumping command signal. The output terminal of an arbitrary one of the plurality of stages is interconnected to the address terminal of another one of the plurality of stages to apply an address signal thereto. The output signal and jumping command signal applied to the arbitrary one of the plurality of stages are detected by a logic control circuit, which provides an output signal at the output terminal of the addressed stage in response to the address signal being applied thereto in dependence on the given program.

DESCRIPTION OF THE PREFERRED EMBODIMENTS

Figure 1:
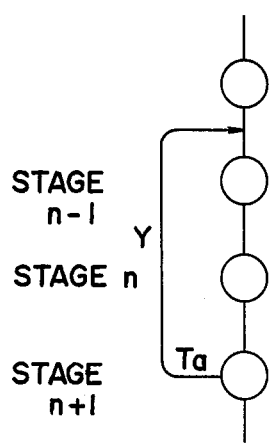
FIG. 1 is one example of a general flow chart illustating how a system proceeds through its steps.

Typically, in digital system control applications, a flow chart as shown in FIG. 1 is used to graphically represent the manner in which a system proceeds through its steps, because such flow chart makes it easy to understand the operational and logical sequence of the control system. Accordingly, it would be very convenient if it were possible to construct a sequential control circuit which would be commensurate with such flow chart. The system of FIG. 1 is a graphical representation of a jump action or loop employing a conditional jump.

Figure 2:
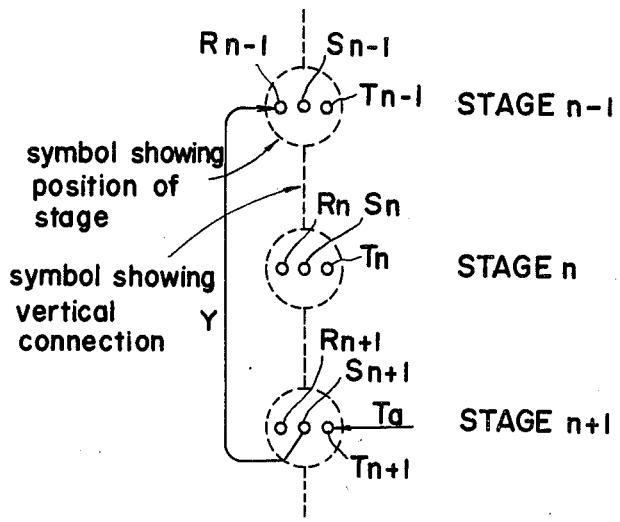
FIG. 2 shows terminal arrangement of any given three steps in the embodiments of the present invention and also shows realization of a program according to the flow chart shown in FIG. 1 by temporary wiring.

The invention provides circuitry to achieve this desirable situation, and an example of a terminal arrangement of a sequential control circuit embodying the invention is illustrated in FIG. 2. The illustrated sequential control circuit comprises a plurality of stages or steps, and the circuit unit of each stage is provided with terminals of a required minimum number which are used to connect the sequence control circuit so as to provide the desired program or sequence control. As is well known, each stage of such sequence is constructed so as to produce sequentially output signals in accordance with a clock pulse signal.

FIG. 2 shows an arrangement of a typical set of three terminals used in setting the program with respect to any three arbitrary stages or steps in the circuit of the present invention. More particularly, the signals at Ta and Y show that this program has structurally embodied the sequential operational flow chart shown in FIG. 1. According to the present invention, any arbitrary program or sequence can be set up by employing the three terminals corresponding to each stage of the control sequence, i.e., the R, S, and T terminals. In this way, by examining the physical arrangement of the wires after the program has been set up, the relationship between each stage of the flow chart and each stage of the set of terminals and the sequence flow and the wirings can be made to correspond exactly. This exact correspondence can be seen by examining the correlation between FIG. 7 and FIG. 8.

In this embodiment of the present invention, the desired number of sets of terminals (three per set) are disposed on the panel surface of the apparatus, while all the accessory circuits or logic sequence circuits connected to the terminals are disposed beneath the panel. Of course, arrangement of the functional circuit mentioned above on an identical panel surface or board surface after transforming it into IC and compact size does not run counter to the gist of the present invention. By providing apparatus in this way, the present invention achieves its object of providing a sequential digital control logic circuit that is useful for experimental and educational purposes. Each stage of the sequential control circuit comprises a circuit unit which is provided with three independent terminals R, S, and T. Terminal S is the output terminal of each stage, terminal T is the transition command receiving terminal, or jumping condition receiving terminal, and terminal R is a terminal designating a transition, or jumping, address. The terms "transition" and "jumping" may be used interchangably and are used herein in the conventional manner to mean a function that causes an output to be produced by a prescribed stage not according to a serial sequence, but rather to be produced by another stage, thus altering the inherent serial order of the control sequence and providing a more powerful system capable of looping. Furthermore, a stage preceding a particular stage which has been prevented from producing an output is termed "a transition starting stage".

A transition or jump is performed by applying a transition command to a transition starting stage, thereby causing it to designate a transition address, i.e., the stage to which the transition is to be made. For example, to designate a transition address, wires Ta and Y are shown connected to the appropriate terminals of the respective stages in FIG. 2.

For purposes of this description, symbols R, S and T are used to designate not only the terminals themselves but also signals passing therethrough, the logic state of the signals, and the conductors connected to the terminals. For example, symbol T is used to also mean a transition condition or a transition command signal. Where it is necessary to discriminate among terminals of respective stages they are designated as $R_1, R_2, \ldots, R_m$; $S_1, S_2, \ldots, S_m$; and $T_1, T_2, \ldots, T_m$. The subscript "n" is used to designate generally some terminal R, S, or T, and following conventional notation practices preceding and subsequent terminals will be designated by the subscript $(n+1)$ or $(n-1)$, respectively. Further, where it is desired to also designate a time corresponding to the clock pulse, a subscript "$\tau$" is added.

Turning now to the operation principles of this invention, the logical decisions necessary to provide the required control sequence are set forth below:

The following listed conditions are required to apply and produce signals to/from terminals R, S and T of any given stage. That is, the conditions in any logical sequence wherein an external signal is applied to the given stage for producing an output therefrom, are as follows:

(a) Where a transition condition does not hold or is not present and no signal is applied to terminal R, the given stage receives "only the output signal from the preceding stage".

(b) Where the transition condition holds and a signal is applied to the terminal R, the given stage receives "only the transition signal".

(c) Where the transition condition holds and where no signal is applied to terminal R, the given stage does not receive "any signal".

(d) Where the transition condition does not hold and where a signal is applied to terminal R, the given stage receives "only the output signal from the preceding stage".

The phrase "transition condition holds" is used herein to mean creation of a condition that causes a transition or jumping and is designated by a symbol J or J' which is termed a transition condition holding signal. The transition condition holding signal also represents the transition logic itself. Symbol J is used to designate the jumping condition holding signal of a sequential control system and symbol J' the jumping condition holding signal of a specific state. The term "transition signal" means a signal connected by a suitable wire or cable from the output terminal S of any stage to the transition address terminal R of some specific stage, i.e., a signal that provides a function occurring as a result of a transition. An example of this is signal Y in FIG. 2. It will be clear, however, from the foregoing description that even when a transition signal is present, the transition does not always result. This transition signal is represented by the symbol S or R and, on some occasions, $S = R$.

To describe the operation more specifically, the terms in quotation marks in items (a) through (d) may be substituted for by the phrase "external signal". Then items (a) through (d) above can be rewritten as follows.

(a') Where a transition condition does not hold and no signal is applied to terminal R, the given stage receives "the external signal".

(b') Where the transition condition holds, and a signal is applied to terminal R, the given stage receives "the external signal".

(c') Where the transition condition holds, and where no signal is applied to terminal R, the given stage does not receive "any external signal".

(d') Where the transition condition does not hold and where a signal is applied to terminal R, the given stage receives "the external signal".

Let us now denote the logical states necessary to realize the conditions (functions) of items (a') through (d') by f(R, J), the "external signal" by X, and the content of X by $X = S' + J'$. Hence, the desired logical equations are expressed by the following:

$$F = X \cdot f(R, J) \ldots e$$
$$X = S' + J' \ldots f$$
$$S \cdot J = 0 \ldots g \quad (1)$$

It is sufficient that condition g of equation 1 satisfy items (a) and (d) alone.

Although the basic equations described above define the principle of this invention, it is possible to obtain the logical configuration of the basic circuit by substituting concrete conditions into equation (1).

Let us determine various terms as follows:

$$f(R, J) = \overline{R} \cdot J \quad (2)$$

$$J = S_1T_1 + S_2T_2 + \ldots + S_mT_m. \tag{3}$$

$$J' = S_T(S_1T_1 + S_2T_2 + \ldots + S_mT_m). \tag{4}$$

Where equation (2) is any one of the logical equations that can be readily derived from (a') through (d') and equations (3) and (4) are equations that can be naturally derived from the definitions described above.

First, equations (2) and (3) are substituted in the fundamental equation (1) to obtain $$F = (S' + J')\overline{R(S_1T_1 + S_2T_2 + \ldots + S_mT_m)} \tag{5}$$

Then equation (4) is substituted in equation (5) to obtain $$F = \{S' + S_T(S_1T_1 + S_2T_2 + \ldots + S_mT_m)\}\overline{R(S_1T_1 + S_2T_2 + \ldots + S_mT_m)} \tag{6}$$

To obtain a general logical equation corresponding to any sequence stage, the following equation (7) is obtained by putting $F = S_n$; $S' = S_{n-1}$; and $S_T = R$.

$$S_n = \{S_{n-1} + R(S_1T_1 + S_2T_2 + \ldots + S_mT_m)\}\overline{R(S_1T_1 + S_2T_2 + \ldots + S_mT_m)} \tag{7}$$

This equation represents a logic of the baic circuit that satisfies the requirements for constructing the desired circuit as provided by the present invention.

The present invention provides a system whereby the logic expressed by equation (7) is embodied as a fixed, basic, circuit connected between the stages of the sequential control circuit. When the basic circuit is constructed according to the present invention, it can perform the function desired by the above-listed logical expressions.

Figure 3:
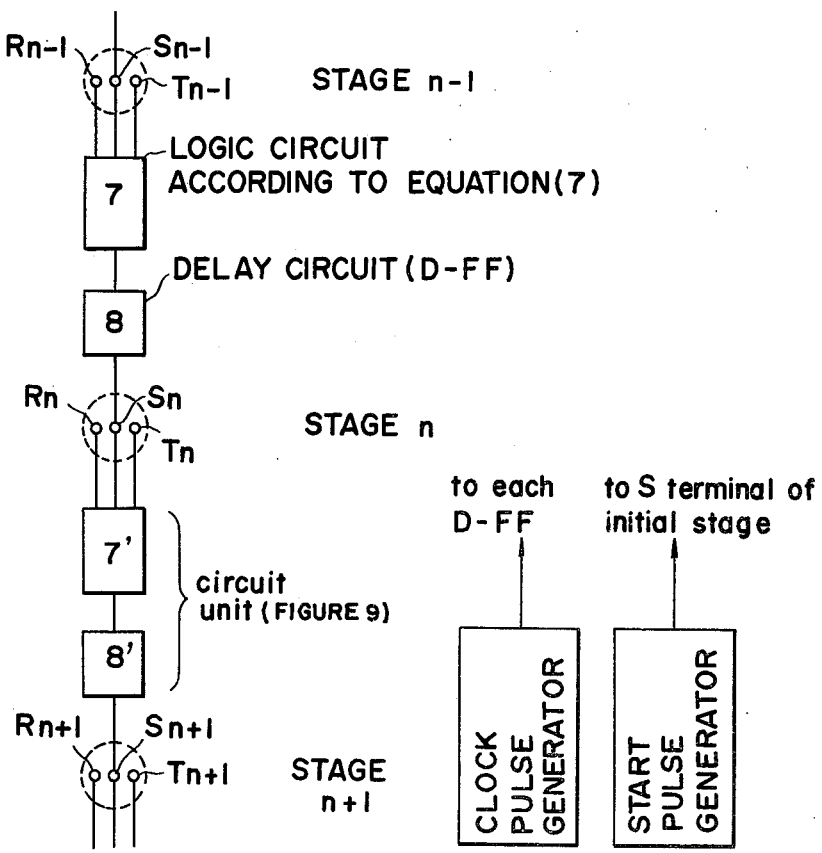
FIG. 3 is a flow diagram showing another appropriate embodiment of a sequence control circuit according to the present invention.

FIG. 3 is a block diagram showing a preferred embodiment of this invention and particularly shows relationship between the basic circuit and each terminal, and the function of the above-mentioned circuit will now be described. Assuming that FIG. 2 shows an arrangement of the terminal portion of FIG. 3, and temporary wires of Ta and Y, i.e., the transition command signals have been connected. Under these circumstances, when the sequential output signal has progressed to the lowest stage of FIG. 2, the logic state of the output terminal signal of this stage is, of course, S=1. Because there is no temporary wire connected to R, and a temporary wire Ta is shown connected at terminal T, and if Ta=1, then the logic is 1, and if Ta=0, then the logic is 0.

Going back up the circuit of FIG. 2, it may be seen that the logical state of the middle stage is S=9, R=0 and T=0. Similarly, the first stage shown in FIG. 2 may be seen to have the following logical state, R=1, S=0, and T=0. Furthermore, the output terminal S of the preceeding stage will also be zero.

Assuming that Ta=1, the logic state of each terminal becomes obvious and, as are defined previously with respect to each stage, when the values of the terminals are substituted for in equation (7), the value of the equation becomes such that for S of the highest stage, the value is 1, and for the middle stage, the value is 0. This logic is executed by the "basic circuit" shown in FIGS. 3 and 9, and becomes the sequence output signal of the S terminal of each stage after the transition has taken place. Of course, this is after one unit of delay time has occurred. The time delay will be described in more detail hereinbelow.

Now, if Ta=0, in a similar calculation, each terminal signal of S becomes 0, 0, 0 according to the above.

Moreover, with respect to the next stage after the lowest stage, although it is not shown in the drawing, the logic of R, S, T of this stage is then R=0, S=0, and T=0 or 1 at the same time, regardless of the presence or absence of the wiring for the program setting, and in the similar calculation, S of this stage becomes 1. In other words, a transition has not taken place, and the sequence output is fed below as it is, i.e., it is serially fed to the next successive stage. Even if the number of stages is increased, the foregoing logic holds and the logical state of the subsequent stage can be resolved.

In any digital control system, it is also necessary to provide some sort of time control, one form of time control may be considered as external timing control, wherein the control system actuates some external device and then receives an answering signal from the device indicating that the desired operation has been performed. The present invention utilizes internal timing control, so that the system timing is achieved without reference to any external devices. Internal timing is accomplished by a delay circuit as shown in FIG. 3. However, to facilitate easy understanding, as shown in FIG. 3, D-FF (D type Flip Flop) is used for delay circuit, it is driven by the clock pulses of the generator. The delay time should be sufficiently long to ensure that the desired operation has taken place. In the case of a digital control system controlling a series of digital electronic conditions, the delays of the system can be relatively short and of equal duration. The basic timing is provided by conventional clock pulses. By the way, in this embodiment, it is needless to say that the start pulses, namely, the single pulses are applied to the S terminal of the initial stage from the outside for the actuation.

Figure 9:
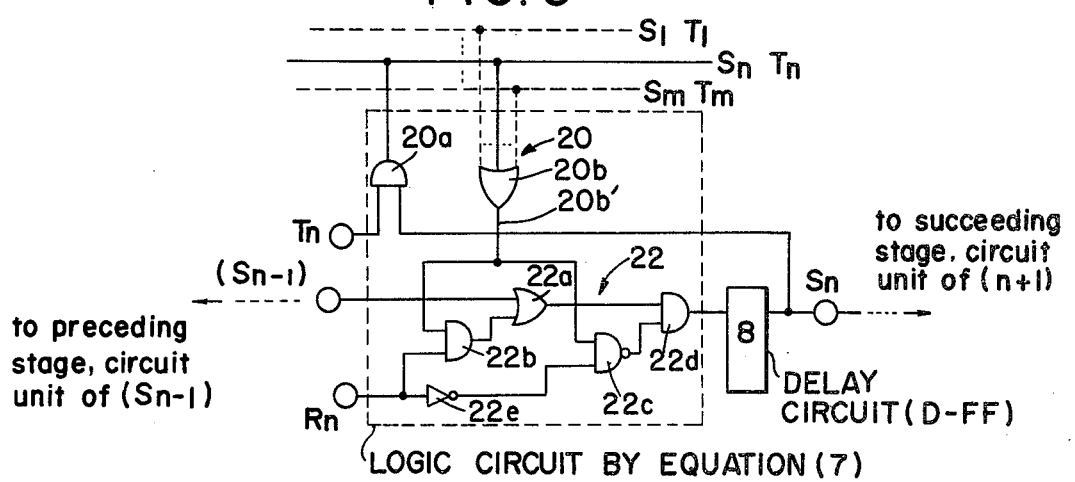
FIG. 9 is a schematic diagram showing the logic circuit of FIG. 3 in more detail.

As shown in FIG. 9, the logic control circuit 7 comprises first gate means 20 composed of an AND gate 20a for detecting the output signal appearing at the output terminal Sn and the jumping command signal applied to the jumping control terminal Tn to provide a first output SnTn indicating that a jumping of the output signal is enabled from an arbitrary stage to another stage which is addressed, and an OR gate 20b having a plurality of input terminals connected to output terminals SnTn, S1T1, SmTm. . .to provide an output 20b'. The logic control circuit 7 also comprises a second gate means 22 including an OR gate 22a, a first AND gate 22b, a NAND gate 22c and a second AND gate 22d. The first gate 22b has one input terminal connected to the output of the OR gate 20b and another input terminal connected to the address terminal Rn. An output of the AND gate 22b is coupled to one input of the OR gate 22a another input of which is coupled to the output terminal Sn-1 of a preceding stage. An output of the OR gate 22a is coupled to one input of the second AND gate 22d, to another input of which is applied an output of the NAND gate 22c. The NAND gate 22c has one input coupled to the output of the OR gate 20b and another input coupled to the address terminal Rn via an inverter 22e. With this arrangement, the output signal appearing at the output terminal Sn-1 is applied through the OR gate 22a to the one input of the second AND gate 22d. In a case where the jumping command signal is not applied to the jumping control terminal of the preceding stage, the output of the OR gate 20b goes to a low logic level so that the one input of the NAND gate 22c of the second gate means 22 is at a low logic level. Therefore, the output of the NAND gate 22c goes to a high logic level irrespective of the logic level of the address signal appearing at the address terminal Rn, thereby opening the AND gate 22d. It will thus be seen that in a normal state in which no jumping command signal is applied to an arbitrary stage, the output signal of the preceding stage is transferred to the output terminal, i.e. Sn, of a subsequent stage. If, in contrast, a jumping command signal is applied to an arbitrary one of a plurality of stages when an output signal appears at the output terminal of the arbitrary stage, then the output of the OR gate 20b goes to a high logic level. If, in this case, no address signal is applied to the address terminal Rn, the output of the NAND gate 22c goes to a low logic level, thereby inhibiting the AND gate 22d so that no output signal appears at the output terminal Rn, then the output of the AND gate 22b goes to a high logic level and is passed through the OR gate 22a to the one input of the AND gate 22d. Since, at the same time, the output of the NAND gate 22c goes to a high logic level when the output signal and the jumping command signal are applied to the arbitrary stage, the output of the AND gate 22d provides an output signal at a high logic level. It will thus be understood that the output signal of an arbitrary stage is transferred or jumped to the output terminal of an addressed stage provided that the output signal and the jumping command signal being applied to the arbitrary stage are at a high logic level and an address signal is applied to the address terminal of the addressed stage.

Figure 4:
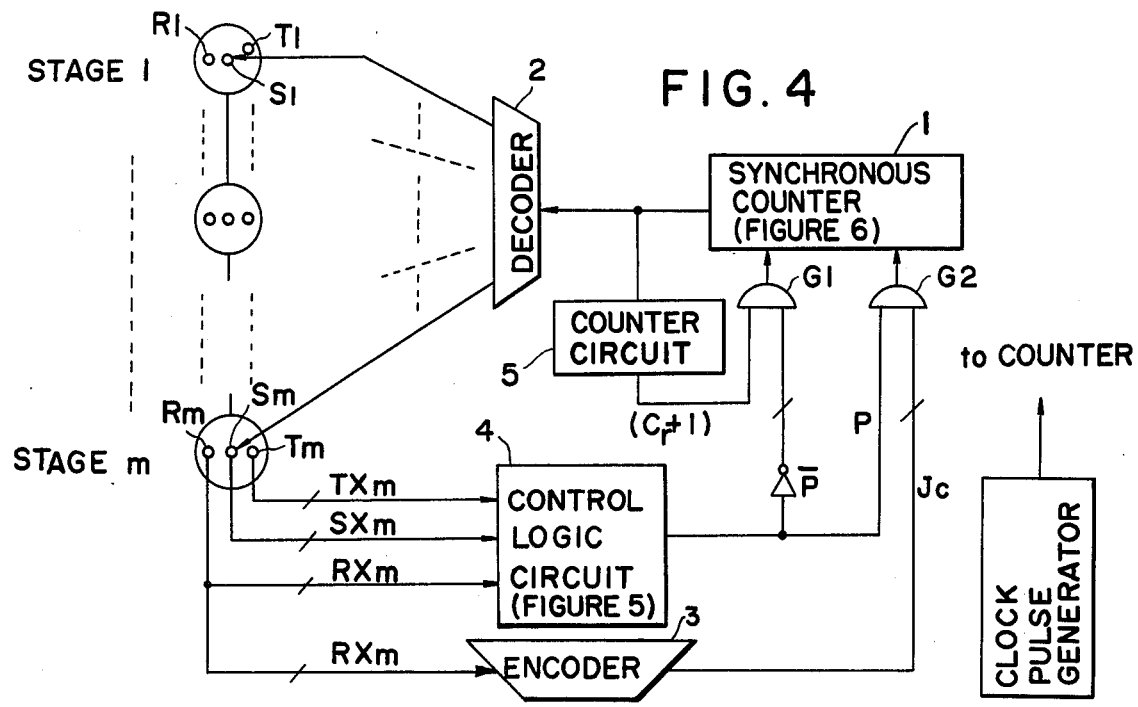
FIG. 4 is a schematic diagram showing another appropriate embodiment of the sequence control circuit based on the present invention.
Figure 6:
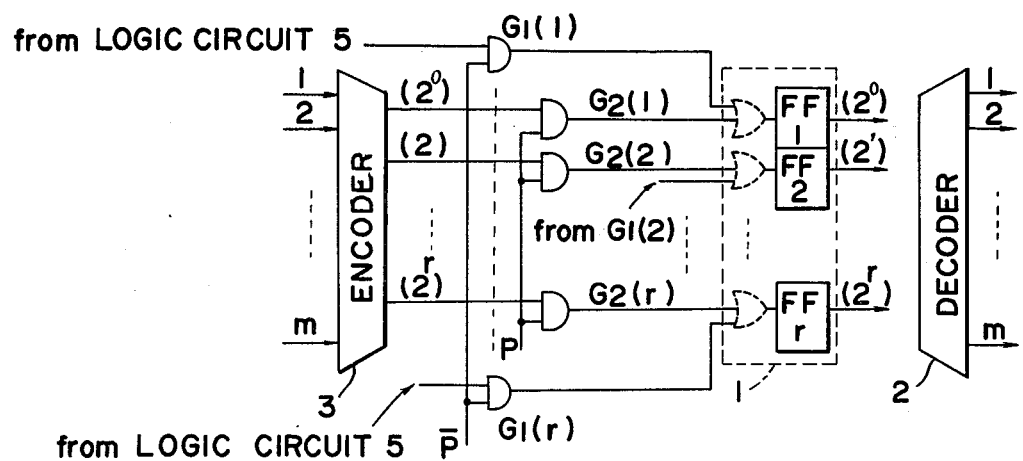
FIG. 6 is a schematic diagram showing the encoder, counter, and decoder of FIG. 4 in more detail.
Figure 5:
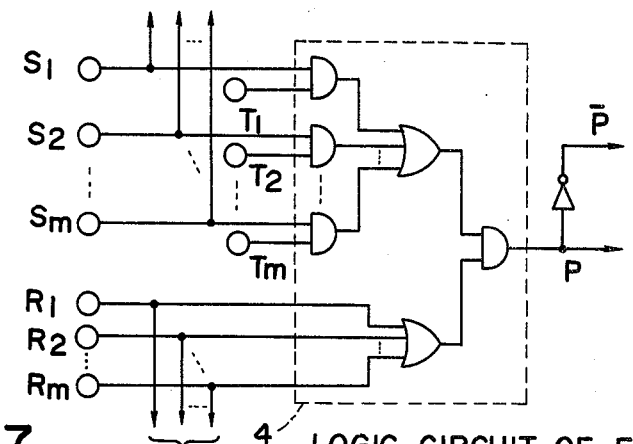
FIG. 5 is a schematic diagram showing the control logic circuit 4 of FIG. 4 in more detail.

Although FIG. 4 shows another preferred embodiment comprising a gated counter 1 wherein the required number of the flip-flops are provided and binary code signals are generated. The binary code signals are $2^0, 2^1, 2^2 \ldots 2^r$. A decoder 2 divides the binary signals into a maximum of $2^r$ parallel output lines each having one bit of the signal on it. These output lines from the decoder 2 are connected to the S inputs of successive stages. The maximum number m of these lines is, of course, set by $m \leq 2^r$ or the maximum number of stages. An encoder 3 is provided to transform the m parallel input lines into binary signals corresponding to the original signals $2^0, 2^1, \ldots 2^r$, that is, the transition address code which corresponds to signals generated at the R terminal. In order to make FIG. 4 easier to understand, the plural input lines RXm to the encoder 3 which run from each of the stages in the system have not been shown, rather, the plurality of lines has been shown emanating from stage m. Similarly, it should be understoood that the input signals to the control logic circuit 4, shown in detail in FIG. 5, are obtained from each stage of the system, but are shown for simplicity as emanating solely from stage m. The output signals from the encoder are fed to particular flip-flops of the counter, through a gate device designated generally as G2. FIG. 6 shows the counter 1 inputs in more detail and in particular, shows that there are gate devices G2 and G1 for each counter 1 input signal. The counter inputs are gated by the signal on line P which is produced by a circuit, shown in FIG. 5, which embodies equation 12', set forth below. A logic circuit 5 for determining the next counting condition of the counter is also provided. Such logic circuits for incrementing counters are so wellknown, no further discussion need be presented. However, the logic circuit 5 of the preferred embodiment is a synchronous binary counter and a logic that determines the next counting condition, and, specifically, comprises the portion of the logic circuit preceding the J-K flip-flops of the counter. Typical of such synchronous binary counters are counters Ser. No. 5 4161 and Ser. No. 74161, manufactured by Texas Instruments, Inc., of Dallas, Texas. Detailed specifications of such counters may be found in *The TTL Data Book For Design Engineers*, published by Texas Instruments, Inc. Of course, from the schematic and the above discussion, it is obvious that the sequence output generated at each S terminal can be obtained in correspondence to the counting condition of the counter.

A transition or jumping in order to provide looping is achieved by the present invention by changing the state of the counter. More particularly, the address code signal of each stage is controlled by the control logic circuit 4 of FIG. 5 to form an input signal which is applied to the counter through a plurality of gate circuits $G_2$. Thus, $$S_{T+1} = C_{T+1} = (C_T + 1)\overline{P} + J_c \cdot P \tag{8}$$

where P represents the control signal through gate circuit $G_1$ (in the general case, the control signal for any stage is expressed by p), C is the content of the counter and Jc is the transition address signal. In FIG. 4, encoder 3 produces the jumping address signals which are derived from the R terminals. The logic circuit 5 for forming $(C_T + 1)$ is discussed above. It should be understood that a plurality of gate circuits $G_1$ and $G_2$ and signal lines P and Jc are provided, depending upon the number of stages employed in the system.

Since the term $(C_T + 1)\overline{P}$ in equation (8) is a logical equation for the counting operation of the counter, and is not directly related to the signals of the transition operations at respective stages, equation (8) should be modified by eliminating this term.

$$S'_n = J_c \cdot p \tag{8'}$$

where S' represents a signal S from which the stepping condition is removed, and p represents an input gate control signal for the counter at any stage. Moreover, according to a mathematical reformation in reference to equations (2), (3) and (7), equation (5) will change as follows:

$$S_n = S'\overline{R \cdot J} + R \cdot J \tag{5'}$$

Assuming that $S'_n$ has the meaning as mentioned above, $$S'_n = R \cdot J \tag{9}$$

and now the equation (8') and equation (9) are compared, $$J_c \cdot p = R \cdot J \tag{10}$$

accordingly, $$J_c \cdot p = J \cdot R \cdot J \tag{11}$$

Consequently, $$p = R \cdot J \text{ namely } p = R(S_1 T_1 + S_2 T_2 + \ldots + S_m T_m) \tag{12}$$

By the way, in the process of obtaining the equation (12) from the equation (10), the reason for placing $J_c = J$ is an empirical equation in the range of not spoiling the meaning of the logic. Therefore, $$P = \Sigma p = (R_1 + R_2 + \ldots R_m)(S_1 T_1 + S_2 T_2 + \ldots S_m T_m) \quad (12')$$

Where $\Sigma p$ is used for the sense of collecting the logic of each stage instead of the strict mathematical meaning.

The logic of this equation can be constructed as a fixed circuit as shown in FIG. 4 and FIG. 5.

As the remark in passing, the first term of the foregoing equation can be used as the following equation.

$$(R_1 + R_2 + \ldots + R_m) = 1$$

In this case, left side of the equation (12') becomes only the second term consequently, but an interesting thing is that this result will become a general mode. Namely, even if all the $R_s$ are logic "0" (fifth stage of FIG. 8 corresponds to this condition), G2 functions effectively, and the counter is set to "0", namely, the initial condition. (Of course, in this case, it is needless to say that the condition of $T_c = 1$ is maintained, and that if $T_c = 0$, the stepping to the next stage is taking place.) However, under some other specific conditions, a logic different from that described above is obtained.

Now, a detailed description of the operation of the embodiment of FIG. 4 will be provided in the following. In the case of working this system, the formation of the panel surface and method of use thereof are identical with those of the preceding embodiment, and they can be materialized, for example, like FIG. 2.

Now, it is assumed that Y and $T_a$ are connected by a temporary wiring according to the program. In this embodiment, the sequence outputs are counted by the clock pulses from the clock pulse generator, and it stands to reason that output line of each flip flop constituting the counter, namely, output lines of the decoder connected to the code signal line are assigned to S terminal of each stage as manufactured.

Let us assume that the panel surface of the embodiment, namely, in FIG. 2, the sequence outputs have stepped forward sequentially and are located at the lowest stage. Also, let us assume that the condition of $T_a = 1$ is established. In this condition, it becomes obvious that the logical value of each terminal signal becomes $R = 1$, $S = 0$, $T = 0$ in the highest stage, and becomes $R = 0$, $S = 0$, $T = 0$ in the middle stage, and becomes $R = 0$, $S = 1$, $T = T_a = 1$ in the lowest stage.

When these values are substituted in the equation (12'), $P = 1$ is established. In the actual circuit, the control logic circuit 4 materializes the logical value (signal), and the gate G2 opens. On the other hand, the R terminal signal (now it is obvious that $R = 1$) of the highest stage enters the encoder, and is converted to the corresponding address code signal of this stage, and passes the G2 and becomes the input (code) signal of the synchronous counter 1. The synchronous counter is forcedly set to the condition of the code by the next clock pulse.

Namely, the sequence output shifts to the S terminal of the highest stage, and jumping is taken place.

Next, it is needless to say that the relationship of each output signal between the decoder, encoder and counter will be described, and the condition of the counter when the specific one piece of the output lines of the decoder becomes '1', namely, the output signal code of the counter and the output signal code of the encoder when the signal of the R terminal of the stage become '1' are set so that the codes are coincided.

Now, coming back to the preceding condition, in the same wiring, the condition (signal) is different from the previous one and $T_a = 0$ is established. With respect to this, by the similar consideration, $P = 0$ is established. In this condition, the G2 gate is closed, and the G1 gate is opened, and as a result, the counter is counted by the clock pulses, and the sequence output shifts to the next stage of the lowest stage. Namely, in the embodiment of FIG. 4, the same result can be obtained which is similar to the preceding embodiment.

The method of using the above described embodiments, that is the method of forming programs, will now be described.

Figure 7:
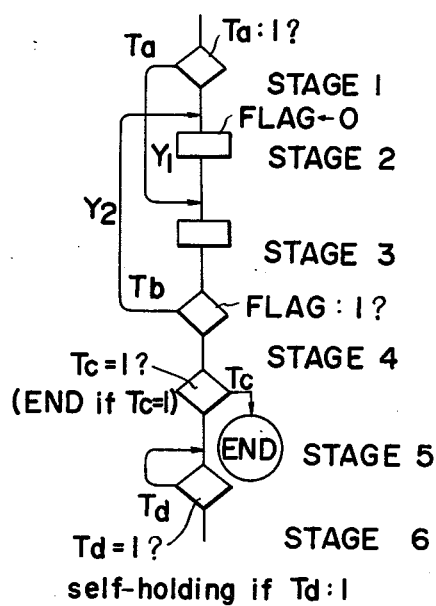
FIG. 7 shows an example of a general and typical flow chart.
Figure 8:
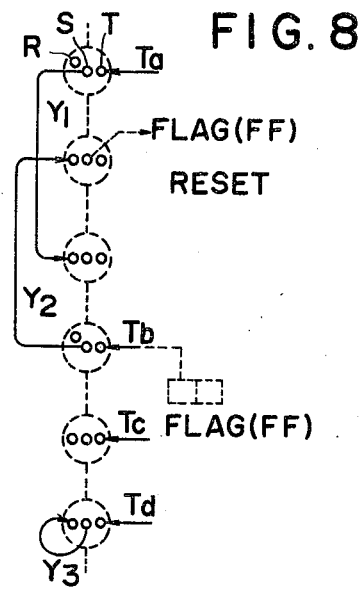
FIG. 8 shows an example wherein a program according to the flow chart shown in FIG. 7 in the embodiment of the present invention is set on a terminal.

FIGS. 7 and 8 show a method of forming a program by utilizing the circuitry shown in FIGS. 3, 4 and 7 in which FIG. 7 shows a flow chart of any given sequence and FIG. 8 shows the logic circuit described hereinabove on a panel of the present invention and corresponding to the flow chart of FIG. 7. T and Y with subscripts are used to show actual wires. In stage 1, when a signal corresponding to Ta is applied to a wire connected to the terminal T of that stage and is equal to a logical one, then the control signal jumps or is transferred to stage 3. In the event that $T_a$ equals zero, the control is serially stepped to the next stage 2. At stage 4, a conditional transition to stage 2 can be effected similarly by the signal $T_b$ appearing at terminal T of stage 4, and if $T_b$ equals 1, the control signal will be jumped to the S terminal of stage 2. When a signal $T_c$ is presented at stage 5, the sequence is terminated at this stage. When signal $T_d$ is presented at stage 6, the circuit self-holds, that is, assumes a holding state. When $T_d = 0$, the self-holding state is released.

In this manner, the invention provides a novel sequence circuit which enables a student to readily form and understand a program.

It will be clear that the logic that performs the function of the basic equation (1) can be realized by many equations other than (7), that the logic can be modified by varying the conditions of the terms of the logical equation, and that the logic circuit described hereinabove can be modified accordingly. The present invention is not limited to the particular embodiment shown, but many be practiced in various other forms. For example, changes of positive logic to negative logic or vice versa, transformation and simplification of the circuit, adoption of the unit system for the entire or a part of the circuit and use of integrated circuits.

What is claimed is:

1. A programable sequence control device for programming a control sequence by simulating the steps of a flow chart, comprising a plurality of stages, each stage of said device being visually representative of a step of the intended flow chart and being selectively wired to other stages for simulating said flow chart, said stages comprising:
   three contact points representing output terminal, address terminal and jumping control terminal, and
   a logic control circuit connected between each two stages at the respective contact points, said logic control circuit comprising:
   first logic means producing a first output signal based on the combination of the signals at the output terminal and jumping control terminal of a first said stage, and second logic means responsive to an address signal applied to the address terminal of another one of said plurality of stages for producing a further output signal applied at the output terminal of said another one of said plurality of stages, whereby upon application of a starting command at a selected stage, the stages sequence through the steps simulating the operations of the intended flow chart.

2. a control device according to claim 1, in which said first logic means comprises a plurality of first gate means each responsive to said output signal and said jumping command signal appearing at the output terminal and the jumping control terminal of each stage, and second gate means responsive to outputs of said plurality of said first gate means to produce said output.

3. A control device according to claim 2, in which each of said plurality of first gate means comprises an AND gate, and said second gate means comprises an OR gate.

4. A control device according to claim 1, in which said second logic means comprises a first gate responsive to said first output signal and said address signal of said other stage to provide a second output, a second gate responsive to the output of said first gate means and said address signal of said other stage to provide a third output, and a third gate responsive to said second and third outputs to produce said output signal applied at the output terminal of said other stage.

5. A control device according to claim 1, in which said second logic means comprises:

encoder means responsive to said address signal to provide a coded signal indicative of said another one of said plurality of stages being addressed;

counting means responsive to said output signal and said coded signal to provide a counting signal; and decoder means responsive to said counting signal to electrically interconnect the output terminal of said arbitrary one of said plurality of stages to the output terminal of said another one of said plurality of stages for thereby permitting transfer of said output signal appearing at the output terminal of said arbitrary one of said plurality of stages to the output terminal of said another one of said plurality of stages.

6. A programable sequence control device for programming a control sequence by simulating the steps of a flow chart, comprising a plurality of stages, each stage of said device being visually representative of a step of the intended flow chart and being selectively wired to other stages for simulating said flow chart, said steps comprising:

three contact points representing output terminal, address terminal and jumping control terminal, and a logic control circuit connected between each two stages at the respective contact points, said logic control circuit comprising:

means for applying an address signal to an arbitrary one of said plurality of stages; said logic control circuit comprising:

logic circuit means including first gate means for detecting the output signal and the jumping command signal appearing at the output terminal and the jumping control terminal of said arbitrary one of said plurality of stages to produce an output, and second gate means responsive to an address signal being applied to the address terminal of another one of said plurality of stages and producing a signal to be applied to an output terminal of said another one of said plurality of stages, whereby upon application of a starting command at a selected stage, the stages sequence through the steps simulating the operations of the intended flow chart.

7. A programable sequence control device for programming a control sequence by simulating the steps of a flow chart, comprising a plurality of stages, each stage of said device being visually representative of a step of the intended flow chart and being selectively wired to other stages for simulating said flow chart, said steps comprising:

three contact points representing output terminal, address terminal and jumping control terminal, and a logic control circuit connected between each two stages at the respective contact points, said logic control circuit comprising:

means for applying an address signal to address terminal of one of said plurality of stages, said logic control circuit comprising:

first means responsive to an output signal appearing at the output terminal of another one of said plurality of stages, an address signal being applied to the address terminal of said one of said plurality of stages, and a jumping command signal being applied to the jumping control terminal of said another one of said plurality of stages to provide a first output signal;

encoder means responsive to said address signal to provide a coded signal indicative of said one of said plurality of stages being addressed;

counting means responsive to said output signal and said coded signal to provide a counting signal; and decoder means responsive to said counting signal to electrically transfer of said output signal appearing at the output terminal of said another one of said plurality of stages to appear at the output terminal of said one of said plurality of stages, whereby upon application of a starting command at a selected stage, the stages sequence through the steps simulating the operations of the intended flow chart.

8. A control device according to claim 7, in which said first means comprises first gate means responsive to the logical product of each output signal appearing at each output terminal of each stage and each jumping command signal appearing at each jumping control terminal of each stage to provide a first output, second gate means responsive to address signals appearing at the address terminals of said plurality of stages to provide a second output, and third gate means responsive to the logical product of said first and second outputs to provide said first output signal.

* * * * *